US008768775B1

(12) United States Patent
Roper et al.

(10) Patent No.: US 8,768,775 B1
(45) Date of Patent: Jul. 1, 2014

(54) METHODS AND SYSTEMS FOR AUTOMATED PRODUCT REGISTRATION

(75) Inventors: Colin John Roper, San Francisco, CA (US); Christian Gregory Dalit, Palo Alto, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 13/284,760

(22) Filed: Oct. 28, 2011

(51) Int. Cl.
*G06Q 20/00* (2012.01)

(52) U.S. Cl.
USPC ............ 705/16; 235/375; 235/380; 235/383; 235/379; 235/381; 235/376; 235/492; 235/377; 235/451; 705/35; 705/23; 705/14.2; 705/14.38; 705/14.3; 705/17; 705/41; 705/15; 705/26.1; 705/18; 705/28; 705/21; 705/30; 705/24; 705/22; 705/26.8; 705/26.7

(58) Field of Classification Search
USPC ................................................ 705/16; 39/16
See application file for complete search history.

(56) References Cited

U.S. PATENT DOCUMENTS

| 6,487,540 | B1 | 11/2002 | Smith et al. | |
|---|---|---|---|---|
| 6,738,749 | B1 | 5/2004 | Chasko | |
| 7,035,813 | B1* | 4/2006 | Cook ............................. | 705/16 |
| 7,987,120 | B2 | 7/2011 | Shiftan et al. | |
| 2001/0053980 | A1 | 12/2001 | Suliman et al. | |
| 2002/0077923 | A1* | 6/2002 | Siegel et al. ..................... | 705/26 |
| 2003/0014267 | A1* | 1/2003 | Culp ................................ | 705/1 |
| 2003/0055733 | A1 | 3/2003 | Marshall et al. | |
| 2003/0061104 | A1 | 3/2003 | Thomson et al. | |
| 2003/0126020 | A1 | 7/2003 | Smith et al. | |
| 2004/0172260 | A1 | 9/2004 | Junger et al. | |
| 2004/0220964 | A1 | 11/2004 | Shiftan et al. | |
| 2006/0038003 | A1 | 2/2006 | Wakasa et al. | |
| 2006/0273163 | A1 | 12/2006 | Gusler et al. | |
| 2007/0069013 | A1 | 3/2007 | Seifert et al. | |
| 2007/0094087 | A1 | 4/2007 | Mitchell et al. | |
| 2007/0288322 | A1 | 12/2007 | Watanabe | |
| 2008/0208762 | A1 | 8/2008 | Arthur et al. | |
| 2008/0235749 | A1 | 9/2008 | Jain et al. | |
| 2009/0271265 | A1 | 10/2009 | Lay et al. | |

(Continued)

OTHER PUBLICATIONS

McCune, Jonathan M. Reducing the trusted computing base for applications on commodity systems. Carnegie Mellon University, ProQuest, UMI Dissertations Publishing, 2009.*

(Continued)

*Primary Examiner* — Ryan Zeender
*Assistant Examiner* — Fawaad Haider
(74) *Attorney, Agent, or Firm* — Vista IP Law Group LLP (57) ABSTRACT

Systems, methods and articles for automating the process of registering a product purchased by a consumer from a merchant in a purchase transaction. Product data including product identification data is obtained from a merchant electronic point of sale system as the consumer checks out. The product data is then automatically transmitted to a product registration system, such as via a consumer's mobile communication device having a product registration app. An auto-registration database is accessed to see if auto-registration is available for the product. If auto-registration is available for the product, then a request is made to the consumer to authorize auto-registration for the product. If the consumer accepts the auto-registration, then consumer data, such as the consumer name and contact information, is sent to the product registration system. The product registration system then creates a product registration record using the product data and the consumer data.

22 Claims, 7 Drawing Sheets

(56) References Cited

U.S. PATENT DOCUMENTS

2010/0287058 A1* 11/2010 Rosskamm et al. ............ 705/23
2010/0325047 A1* 12/2010 Carlson et al. .................. 705/44
2011/0125598 A1   5/2011 Shin et al.

OTHER PUBLICATIONS

Non-Final Office Action dated Sep. 27, 2011 in U.S. Appl. No. 12/541,580, filed Aug. 14, 2009, (21 pages).
Interview Summary dated Dec. 15, 2011 in U.S. Appl. No. 12/541,580, filed Aug. 14, 2009, (3 pages).
Amendment dated Dec. 15, 2011 in U.S. Appl. No. 12/541,580, filed Aug. 14, 2009, (12 pages).
Final Office Action dated Mar. 1, 2012 in U.S. Appl. No. 12/541,580, filed Aug. 14, 2009, (25 pages).
4UBenefits, Unique Insurance Solutions, web pages downloaded from website https://4ubenefits.com on Aug. 12, 2009 (9 pages).
Amendment dated Apr. 27, 2012 in U.S. Appl. No. 12/541,580 filed Aug. 14, 2009, (14 pages).
Office Action dated Oct. 3, 2011, Amendment dated Feb. 3, 2012, Final Office Action dated Apr. 5, 2012 and Interview Summary dated Aug. 14, 2012 in U.S. Appl. No. 12/625,540 filed Nov. 24, 2009, (52 pages).

* cited by examiner

METHODS AND SYSTEMS FOR AUTOMATED PRODUCT REGISTRATION

BACKGROUND

The invention relates to registration of products to a particular consumer, such as product registration of software or a television; and more particularly, to new systems and methods for automating, at least in part, the process of registering products to a respective consumer.

Many companies that sell products provide a process for allowing a consumer to register a purchased product with the company which documents the consumer as the owner and user of a particular product purchased by the consumer. For instance, a product provider, such as a manufacturer, seller, distributor, and/or retailer, may provide a website where a consumer can register a product. The product will typically include information describing how the product can be registered, such as by filling out a registration card and mailing it to the provider, or completing an online registration form. The registration will include product data, such as the make and model of the product and in some cases a serial number identifying the particular product. The registration will also request consumer data from the consumer, such as the consumer's name, address, contact information, such as email address and/or phone number. The consumer data may also include more personal information such as age, gender, income, and other personal information. Thus, the product registration gives the product provider a record of the relationship between a product and the consumer that purchased the product, in addition to other data that can be obtained regarding the consumers, such as consumer demographics.

Product registration can provide many benefits to the product providers, and to the consumers. For example, product registration allows the product providers to contact the consumer with product information, such as product updates, recalls, and warranty information. The registration can also allow the consumer to provide feedback and reviews of the product. In addition, registration can serve as a verification of ownership if the product is stolen or lost. From a marketing perspective, product registration allows product providers to communicate with their customers, providing an opportunity to up-sell their products, cross-sell other products such as warranties and service agreements, and market new products. The information obtained from product registration also allows the providers to maintain a database of their customers and obtain marketing data about their customers which can be used to develop and implement marketing plans and maintain a relationship with their customers. For instance, special offers and promotions may be offered to registered consumers.

However, many consumers forego product registration for various reasons. Some consumers prefer not to register their products because of privacy concerns, and they prefer not to be contacted and/or solicited as a result of product registration. In addition, some consumers avoid product registration because it is time consuming and a hassle to register. Registering can be a painful experience because the consumer needs to manually enter a lot of information, such as the product data and consumer data described above.

Nowadays, most point of sale ("POS") purchases of products are processed electronically using a computerized cash register system, also called an electronic point of sale system. The cash register system typically has a "cash register," which is now quite commonly a standalone computer with point of sale software, having a cash drawer for storing cash and coins. Usually, the cash register is operably coupled to some form of product scanning device, such as a barcode scanner. The individual cash registers may also be networked to a central database and back office system capable of processing payment transactions, tracking inventory, etc. In order to process a purchase, the product is entered into the electronic point of sale system, such as by scanning a barcode on the product, or otherwise entering a product identification code into the POS system. The cash register system will typically also have an electronic payment device, such as a credit/debit card terminal.

Indeed, electronic payments have become more and more common for consumers to pay merchants for goods or services. Electronic payments come in various forms, the most common being financial account cards such as credit cards and debit cards, but also include gift cards, ATM cards, payments such as ACH, e Check, PayPal®, and other forms of payment capable of being electronically executed. In addition to fixed location credit card terminals, payment applications (software programs) have been developed for accepting electronic payments on mobile communication devices, such as smartphones, tablet computers, and laptop computers. In this way, electronic payments can be accepted almost anywhere.

While financial account cards are quite convenient, even more convenient electronic payment forms are becoming available, such as near field communication (NFC) devices and "mobile wallets" implemented on mobile communication devices like smartphones. NFC devices are small tags (sometimes referred to as RFID tags, radio-frequency identification) having encrypted identification information for referencing a financial account. The mobile wallet enabled smartphones also have an NFC device incorporated into their electronics. The NFC device or smartphone need only be placed in close proximity (as used herein, close proximity includes being in contact with) to a merchant NFC reader in order to establish a communication connection. The NFC reader then communicates with the NFC device or smartphone in order to exchange sufficient information to complete a purchase transaction. For example, the NFC device or smartphone may transmit encrypted financial account or customer identification information to the NFC reader, which can then be used to process the purchase transaction. As with a typical credit/debit card transaction, the customer may also have to input a personal identification number (PIN) or other verification data in order to authorize and complete the transaction.

In order to process an electronic payment transaction, a merchant enters financial account data tendered by the customer into the electronic payment device, be it a payment terminal, mobile communication device, NFC reader or the like. For example, the customer may tender a credit card, and the merchant may enter the credit card data into the payment terminal by swiping the card in a card reader of a payment terminal to read the data from the magnetic strip on the credit card. The merchant also enters the amount of the transaction into the payment terminal, which may be automatically executed by an electronic POS system. Certain verification information may also be entered, such as a card verification value ("CVV") and/or card expiration date.

The transaction data, including the card number, purchase amount and verification information are transmitted to a merchant account provider, or a third party payment processor, such as First Data, which then sends the data to a merchant account provider. A merchant account is part of merchant services provided by a debit/credit card payment processor and/or independent sales organization ("ISO") (also referred to as the merchant services provider) based on an agreement (referred to as the merchant service agreement) between a merchant (e.g., a retailer), a financial institution (e.g., a merchant bank that issues the debit/credit card), the payment processor and/or ISO, for the settlement of debit/credit card transactions. In particular, the payment processor and/or ISO may be a bank or underwritten by a bank. The merchant account provider is the account provider that provides the electronic payment processing services to the merchant. The merchant account provider then sends the financial account transaction, within batched transactions, through one of the electronic payment networks, such as Visa®, Mastercard®, or American Express®, to the prepaid card issuer (or the bank of the card issuer). Typically, the credit/debit card issuer then pays the merchant account provider the purchase amount less a transaction fee, and the merchant account provider then pays the merchant the amount of the electronic payment, minus a fee for processing the transaction. Alternatively, the prepaid card issuer may directly pay the merchant the amount of the electronic payment, minus a fee for processing the transaction. In summary, the transaction steps in settling debit/credit card transactions include authorization, clearing, funding, and the handling of any chargebacks.

The computers systems and communication systems required to process the above-described electronic payments is called an electronic payment processing system. The electronic transaction flow is similar to the credit card transaction described above for the other forms of electronic payments, such as debit cards, eChecks, ACH, NFC tag payments, and mobile wallet payments.

SUMMARY

The present invention is directed to systems, methods and articles of manufacture for automating the process of registering a product purchased by a consumer from a merchant in a purchase transaction. Product registration is, generally speaking, the creation of an electronic record in a database which relates the product to the consumer, including product data, such as the product model and/or serialized identifier of the product, and consumer data, such as name, and contact information like email address, phone number, mailing address, etc. The invention may be implemented on a computerized product registration system and/or a mobile communication device, such as a cellular phone, smart phone, portable computer, etc., having hardware and software configured to implement the product registration process, as described in more detail below.

Accordingly, one embodiment of the present invention is directed to a method of registering a product using a product registration system comprising at least one computer. In the method, the product registration system receives product data including product identification data. The product identification data may include the manufacturer and model of the product, or a code such as a universal product code ("UPC"), which can be used to identify the particular product. The product registration system receives the product data from either a merchant electronic point of sale system or a mobile communication device of the consumer.

As described above, when a consumer purchases a product from a merchant, the merchant enters the product into the merchant electronic point of sale system, such as by scanning a barcode on the product or otherwise entering a product code. Therefore, the product data received by the product registration system may be transmitted from the merchant electronic point of sale system after the product has been entered into the merchant electronic point of sale system, substantially concurrently with the purchase transaction. In another aspect, the product may be entered into the merchant electronic point of sale system at the time of the purchase transaction, and then the merchant electronic point of sale system may transmit the product data to the consumer's mobile communication device, such as by using an NFC connection between the mobile communication device and an electronic payment device of the electronic POS system. Then, the mobile communication device can transmit the product data to the product registration system through the communication network.

The product registration system also electronically accesses consumer data including personal information of the consumer, such as name, and contact information like email address, phone number, mailing address, etc. For example, the consumer data may be accessed from a record stored on the mobile communication device which the consumer authorizes to be accessed by the product registration system (which may include transmitting the consumer data to the product registration system by the mobile communication device).

Finally, the product registration system creates a registration record using the product data and consumer data which relates the product to the consumer. The record is stored in a database which can be accessed to utilize the product registration for various purposes, such as those described above.

In another aspect of the just described method, the product registration system may determine whether the product qualifies for registration using the automated registration process prior to proceeding with the registration process. For instance, the product registration system may store a database of products which are eligible for automated registration using the automated method. Then, when the product registration system receives product data, the system determines whether the product is eligible for automated registration using the database. If the product is eligible for automated registration, the system then identifies the information required to register the product using the database. The system electronically sends a message to the consumer asking the consumer if the consumer wants to register the product. Only after the consumer responds affirmatively, then the consumer data is accessed and received by the product registration system.

Another embodiment of the present invention is directed to a method of registering a product purchased by a consumer from a merchant in a purchase transaction using a mobile communication device of the consumer, such as a cellular phone or smartphone. As described above, a merchant enters a product being purchased by a consumer into the merchant electronic point of sale system. Then, in this method, the mobile communication device establishes a proximity communication connection, such as an NFC connection, with the merchant electronic point of sale system. For instance, the mobile communication device may connect to an electronic payment terminal of the electronic POS system, such as during the process of making payment using an NFC tag or mobile wallet application. The mobile communication device receives product data, including the product identification data, from the electronic POS system (e.g. the payment terminal) via the communication connection.

The mobile communication device transmits the product data to a product registration system having a first computer. The mobile communication device may transmit the product data to the product registration system using a communication network, which may include a cellular phone network. The mobile communication device also transmits consumer data to the product registration system. The consumer data may be from a record stored on the mobile communication device. The product data and consumer data transmitted by the mobile communication device to the product registration system are related to each other as part of the same purchase transaction. This may be as simple as sending the data in the same communication transmission, or it can be more complex, such as using some data code to relate them. In this way, the product registration system can match the consumer data to the product data.

The product registration system can then use the product data and consumer data to create a product registration record.

In another aspect of this method, similar to the method for the product registration system described above, the method may include steps for obtaining approval from the consumer to send the consumer data to the product registration system and/or to register the product. Prior to sending the consumer data, the mobile communication device receives a request to the consumer for authorization to register the product. The consumer then either accepts or rejects the request. If the consumer accepts the request, then the mobile communication device transmits the consumer data to the product registration system. The request may also specify the consumer information needed for registering the product, such as required information like name and email address, and optional information, such as age and gender.

The consumer data is sent from the mobile communication device from a record stored on the mobile communication device and/or consumer data entered into the mobile communication device to be sent, such as additional information specified in the request that is not in the stored record, and/or information that needs to be updated from the data in the stored record.

Still another embodiment of the present invention is directed to a product registration system for implementing the above-described methods for registering a product purchased by a consumer from a merchant. The product registration system comprises one or more computers, servers, storage devices and communication devices. The product registration system also comprises one or more software applications programmed to implement the product registration methods of the present invention. The storage devices may store a database of product registration records created by the product registration system. The communication devices are operably connected to a communication network to provide communication between the product registration system and a merchant electronic point of sale system (which may be via other parts of an electronic payment processing system), a mobile communication device of a consumer such as a smartphone, and/or to a product provider product registration system.

The product registration system is configured and programmed to perform the steps of at least one of the method embodiments of the present invention for automated product registration, including, for example, a method comprising the steps of: (a) electronically receiving product data including product identification data, the product data received from one of a merchant electronic point of sale system or a mobile communication device of the consumer, the product data having been obtained by the one of the electronic payment device or the mobile communication device substantially concurrently with the purchase transaction; (b) electronically receiving consumer data including personal information of the consumer, the consumer data and product data related to each other as part of the purchase transaction; and (c) creating a registration record relating the consumer to the product using the product data and the consumer data received by the product registration system.

Another embodiment of the present invention is directed to a mobile communication device for implementing the above-described methods for registering a product purchased by a consumer from a merchant. The mobile communication device may be any suitable, portable communication device such as a cellphone, smartphone, tablet computer, etc., having a communication adapter for electronically communicating with other devices. The communication adapter may be a cellular phone transceiver, a WIFI transceiver, a wireless USB adapter, or the like. The mobile communication device has an application (often called an "app," which is a software program that configures the mobile communication device to perform certain functions) which programs the mobile communication device to perform the certain functions of the product registration method.

Thus, the mobile communication device is configured and programmed to perform the steps of at least one of the method embodiments of the present invention for automated product registration, including, for example, a method comprising the steps of: (a) establishing a communication connection with a merchant electronic point of sale system when the mobile communication device and electronic payment device are in close proximity; (b) receiving product data including product identification data from the electronic payment device via the communication connection; (c) transmitting the product data to a product registration system including a computer; and (d) transmitting the consumer data to the product registration system, wherein the consumer data and product data are related to each other as part of the purchase transaction.

Another embodiment of the present invention is directed to an article of manufacture comprising a computer program carrier readable by a computer and embodying instructions executable by the computer to program a computer system to perform the steps of at least one of the method embodiments of the present invention, including, for example: (a) electronically receiving product data including product identification data, the product data received from one of a merchant electronic point of sale system or a mobile communication device of the consumer, the product data having been obtained by the one of the electronic payment device or the mobile communication device substantially concurrently with the purchase transaction; (b) electronically receiving consumer data including personal information of the consumer, the consumer data and product data related to each other as part of the purchase transaction; and (c) creating a registration record relating the consumer to the product using the product data and the consumer data received by the product registration system. As another example, the article of manufacture comprising a computer program carrier readable by a computer and embodying instructions executable by the computer to program a computer system to perform the steps of: (a) establishing a communication connection with a merchant electronic point of sale system when the mobile communication device and electronic payment device are in close proximity; (b) receiving product data including product identification data from the electronic payment device via the communication connection; (c) transmitting the product data to a product registration system including a computer; and (d) transmitting the consumer data to the product registration system, wherein the consumer data and product data are related to each other as part of the purchase transaction.

BRIEF DESCRIPTION OF THE DRAWINGS

The foregoing and other aspects of embodiments are described in further detail with reference to the accompanying drawings, wherein like reference numerals refer to like elements and the description for like elements shall be applicable for all described embodiments wherever relevant.

DETAILED DESCRIPTION OF ILLUSTRATED EMBODIMENTS

Embodiments of the present invention are directed to systems, methods and articles for automating the process of registering a product purchased by a consumer from a merchant in a purchase transaction. The embodiments are implemented on a product registration system and/or a mobile communication device of the consumer. When a consumer makes a purchase from a merchant, product data including product identification data is obtained from a merchant electronic point of sale system as the customer checks out. The product data is then automatically transmitted to a product registration system, which may be via the mobile communication device. In other words, the merchant POS system may first transmit the product data to the mobile communication device and then the mobile communication device transmits the product data to the product registration system. For instance, when the consumer pays for the product, the consumer may use a mobile wallet application by establishing an NFC connection with an electronic payment terminal of the electronic POS system. The product data may then be accessed by the mobile communication device, such as in the form of an electronic receipt for the purchase. Then, an auto-registration database is accessed to see if auto-registration is available for the product. If auto-registration is available for the product, then a request is made to the consumer to authorize auto-registration for the product. If the consumer accepts the auto-registration, then consumer data, such as the consumer name and contact information, is sent to the product registration system. The product registration system then creates a product registration record using the product data and the consumer data.

Figure 1:
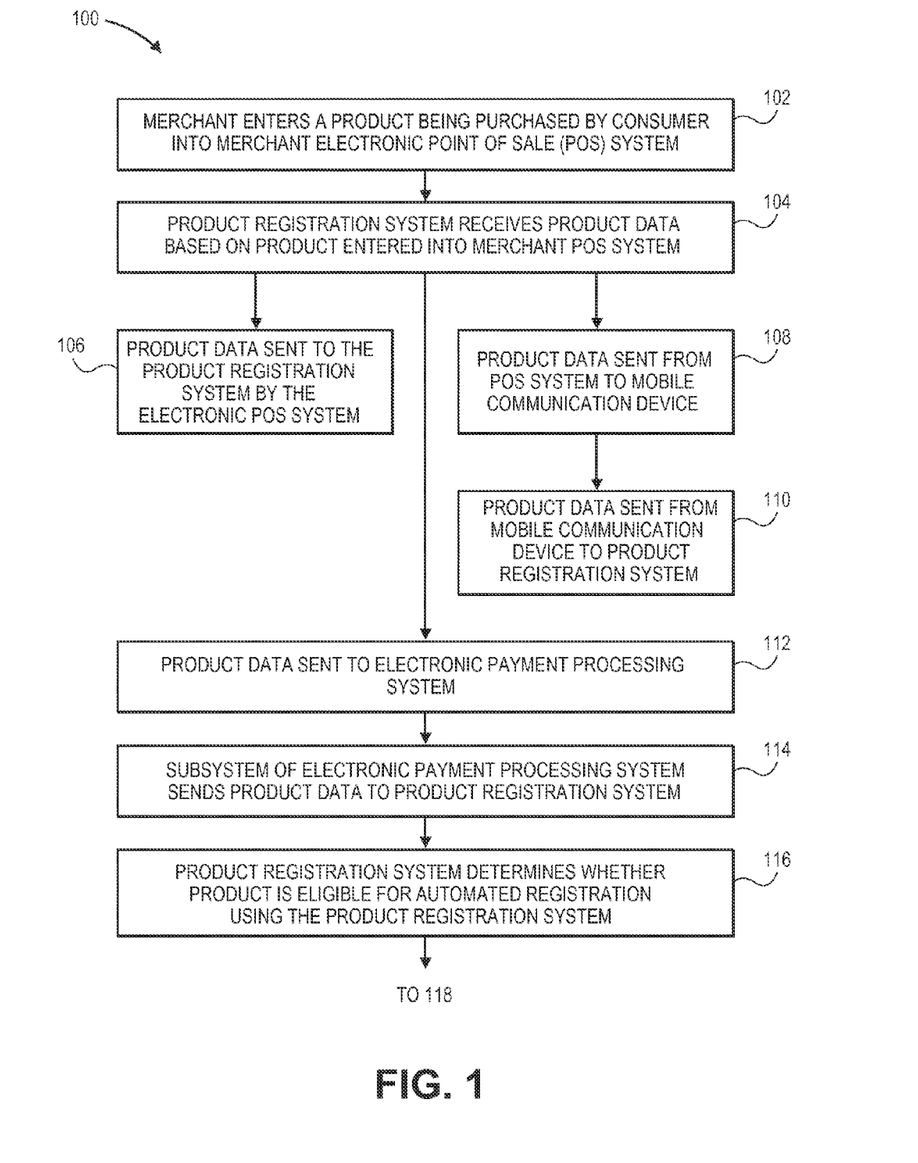
FIG. 1 is a flow chart of a method for registering a product purchased by a consumer from a merchant in a purchase transaction, according to one embodiment of the present invention.

Referring to FIG. 1, in one embodiment, a method 100 for registering a product purchased by a consumer from a merchant in a purchase transaction is shown. The method 100 will typically be implemented within a computerized product registration system comprising at least one computer, such as the system 300 described in more detail below. The product registration system is operably connected to a communication network for electronically communicating with at least one of a merchant electronic point of sale system and/or a mobile communication device of the consumer. At step 102, the merchant enters a product being purchased by the consumer into the merchant electronic point of sale system. As described above, this may be done by scanning a barcode on the product with a barcode scanner of the electronic point of sale system, by entering a product code into the POS system, by reading an RFID (radio frequency identification) tag, or other suitable method.

At step 104, the product registration system receives the product data based on the product entered into the merchant POS system. The product data may include various information about the product, such as the manufacturer and model of the product, a code such as a universal product code ("UPC") referenced to the product, a serial number (which may include numbers, letters, symbols, or a combination of the foregoing) unique to the particular product being purchased, or other information which may be used to identify the product. The product data may be sent to the product registration system in various ways. For instance, at step 106, the product data is sent to the product registration system by the electronic POS system to the product registration system via a communication network.

In another way, at step 108, the product data is first sent from the electronic POS system to a mobile communication device of the consumer via a close proximity communication connection between the POS system and the mobile communication device. The close proximity communication connection may be an NFC connection, a WIFI connection, or other electronic connection having a relatively limited range, such as within a store, or building or shopping center. The mobile communication device may have a product registration app (which may be a part of a mobile wallet app), that retrieves product data from the POS system via the proximity communication connection. For instance, the product data may be retrieved by the app on the mobile communication device when the consumer uses the mobile wallet to pay for the purchase, such as by swiping the mobile communication device with an electronic payment terminal of the merchant POS system. Then, at step 110, the product data is sent from the mobile communication device to the product registration system via a communication network which may include a cellular network, a WIFI network, and/or the internet.

In yet another method of sending the product data to the product registration system, at step 112, the product data is transmitted to an electronic payment processing system. An electronic payment processing system typically includes a merchant account processing system of the merchant account provider for the merchant. The merchant account processing system is networked to the merchant electronic POS system for processing electronic payments for the merchant. The merchant account processing system is also in communication with an electronic payment network system, such as those systems operated by Visa®, Mastercard®, or American Express®, through a communication network. In turn the electronic payment network system is in communication with the financial account issuer, such as a credit card or debit card issuer. At step 114, any of the subsystems within the electronic payment processing system may transmit the product data to the product registration system.

As an optional step, at step 116, the product registration system determines whether the product qualifies for registration using the automated registration process prior to proceeding with the registration process. The product registration system stores a database of products which are eligible for automated registration using the automated method. The database may also include the information required for registering each respective product that is eligible for registration using the product registration system. For example, some products may require more or less information for registration.

When the product registration system receives product data at step 104, the system determines whether the product is eligible for automated registration using the database. If the product is eligible for automated registration, at step 118, the system determines the information required to register the product using the database. If the system determines that the product is eligible for registration, then the system continues with the method 100, as described below. If the product is not eligible for registration, then the process ends.

As another optional step, at step 120, the product registration system asks the consumer if the consumer wants to register the product using the automated product registration system. This may be done by sending a message to the consumer, such as an email, SMS text message, or an alert using the product registration app on the mobile communication device. If the consumer responds affirmatively to register the product, then the product registration system continues with the method 100, as described below. If the consumer declines the request, then the process ends.

At step 122, the product registration system receives consumer data including personal information of the consumer. The consumer data may include the consumer's name, contact information such as mailing address, email address, phone number(s), etc. The consumer data may also include other personal information such as age, age range, gender, income, household income, marital status, etc.

The consumer data may be accessed by the product registration system in a variety of ways. As used herein, the terms "access" and "receive" (and all forms thereof), with respect to information "accessed" or "received" by an element, means that the respective element retrieves the information, receives the information, is sent the information or otherwise obtains the information. For example, at step 124, the product registration system may access the consumer data from a record stored on the mobile communication device of the consumer. The mobile communication device may have a product registration app which creates and stores a consumer data record and provides access to the consumer data to the product registration system through a communication network. The product registration app may be a part of a mobile wallet app, as described in more detail below. At step 126, the app may have an authorization process in which the product registration system sends a message to the mobile communication device requesting authorization to access the consumer data for registering the product. At step 128, the consumer can send a message to the product registration system to accept or reject the request for authorization. If the consumer accepts the request, then the consumer data is accessed by the product registration system, and the product registration system proceeds to register the product, as described for step 136 below.

In another method for the product registration system to access the consumer data, at step 130, the consumer data is stored in a consumer data record in the product registration system. For instance, the consumer may have previously registered with an automated product registration service provided by the product registration system or another system accessible by the product registration system. As part of the automated product registration service, the consumer provides consumer data to the product registration system. When the consumer registers for the service, such as through an internet website that is part of the service, the registration system may request certain personal information from the consumer that is commonly required for product registrations. The product registration system uses this information to create a consumer data record for the consumer. As an optional step, at step 131, the product registration system may send a request to the consumer to authorize the system to register the product using the consumer data. The request can be sent by any suitable method, such as an email or SMS text message to the consumer's mobile communication device. At step 132, the product registration system receives a message from the consumer accepting or rejecting the request for authorization to register the product. At step 134, if the consumer accepts the request, then the product registration system accesses the consumer data stored in a consumer data record in the product registration system, and proceeds to register the product, as described for step 136 below.

The product data and consumer data received by the product registration system are related to each other as part of the same purchase transaction such that the product registration system can determine that the product identified by the product data is to be registered to the consumer linked to the consumer data. This may be done by simply sending the product data and consumer data in the same communication transmission, in the case where the product data and the consumer data are sent from the same device or system (e.g. the mobile communication device). Alternatively, the consumer data and product data can be related by using a data code or other identifier to mark the respective data as being for the same purchase transaction.

As another optional step, at step 136, the product registration system may request additional consumer data and authorization from the consumer to complete the product registration. This may be accomplished using several methods. For example, where the product is a software product to be installed on a consumer's computer, during installation, the software product can have a registration module, or the software product can bring up a product registration website on the consumer's computer. For example, in registering a software product having a serial number, the serial number was accessed by the product registration system at step 104, described above. When the consumer installs the software product on the consumer's computer, at step 138, the software product being installed contacts the product registration system and identifies the product being installed using the serial number, such as via an internet connection with the consumer's computer. The product registration system uses the serial number of the product to identify the product and the consumer, as the product serial number related to the consumer was previously been received by the product registration system. At step 140, the product registration system sends a message to the computer which is used by the software product being installed to request additional data for completing the product registration. For instance, the message may include consumer data already in the product registration system which may be used by the software product to fill out at least some of a registration questionnaire that is displayed to the consumer on the computer. The registration questionnaire may also include blank spaces for missing information, or it may present a series of requests for consumer information. The software product may also request authorization from the consumer to complete the product registration process using the consumer data. At step 142, the product registration system receives the consumer data input into the registration questionnaire, which is sent from the computer using the software product. The product registrations system may also receive authorization from the consumer to complete the product registration process using the consumer data.

Using the website method for step 136, at step 144, as the software product is being installed, the software product brings up a product registration page of a website linked to, or a part of, the product registration system. The website may be displayed in the default web browser for the consumer computer, such as Internet Explorer™. This can be done automatically, or the software product can display an option to the consumer which the consumer can accept to proceed with product registration. At step 146, the software product also sends product data, such as the serial number, to the product registration system. At step 148, the website displays to the consumer a product registration questionnaire which may have some information already filled out using the consumer data accessed by the product registration system at step 104 above. The registration questionnaire may also include blank spaces for missing information, or it may present a series of requests for consumer information. The website may also request authorization from the consumer to complete the product registration process using the consumer data. At step 150, the product registration system receives the consumer data input into the website by the consumer. The product registrations system may also receive authorization from the consumer via the website to complete the product registration process using the consumer data.

At step 152, a product registration record is created which relates the consumer to the product using the product data and the consumer data received by the product registration system. The product registration record can be created in several different ways. As one example, at step 154, the product registration system creates the product registration record. As an alternative, at step 156, the product registration system may send the product data and consumer data to a product provider product registration system. This may be a product registration system of a manufacturer, retailer, distributor or other seller of the product that desires to have their products registered to the consumers. Then, at step 158, the product provider registration system creates the product registration record.

Figure 2:
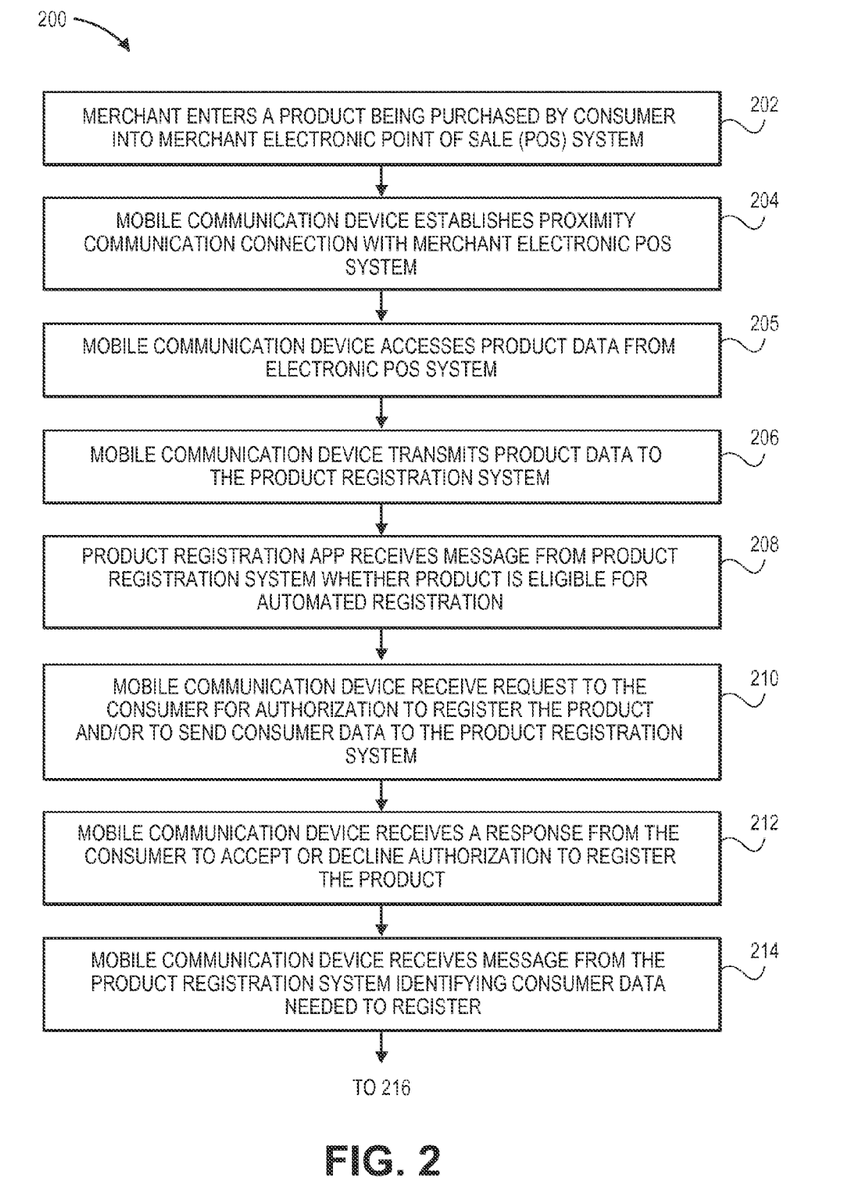
FIG. 2 is a flow chart of a method for registering a product purchased by a consumer from a merchant in a purchase transaction using a mobile communication device, according to another embodiment of the present invention.

Turning now to FIG. 2, in another embodiment of the present invention, a method 200 for registering a product purchased by a consumer from a merchant in a purchase transaction using a mobile communication device of the consumer, is shown. The mobile communication device may be a smartphone, cellular phone, tablet computer, laptop computer or portable computer. The mobile communication device can be the same or similar to the mobile communication device described above with respect to method 100 described above, and may also perform the same or similar functions. Furthermore, in the method 200, the mobile communication device interacts with a product registration system, which may be the same or similar to the product registration system described above with respect to method 100. Accordingly, where applicable, the description above for method 100 also applies to method 200.

The method 100 will typically be implemented within a computerized product registration system comprising at least one computer, such as the system 200 described in more detail below. The product registration system is operably connected to a communication network for electronically At step 202, the merchant enters a product being purchased by the consumer into the merchant electronic point of sale system. This is the same as step 102 described above, and all of the description above regarding step 102 applies to step 202.

At step 204, the mobile communication device establishes a proximity communication connection with the merchant electronic POS system. The close proximity communication connection may be an NFC connection, a WIFI connection, or other electronic connection having a relatively limited range, such as within a store, or building or shopping center. For instance, the mobile communication device may establish a close proximity communication connection with an electronic payment terminal of the merchant electronic POS system. This may be done during the process of the consumer making payment for the product using a mobile wallet app on the mobile communication device. As described above, a mobile wallet app is a software app installed on a mobile communication device which enables the mobile communication device to make an electronic payment to an electronic payment terminal. The mobile communication device may have an integrated NFC device for transmitting encrypted financial account or customer identification information to the electronic payment terminal to make an electronic payment. The electronic payment is then processed as described above, which is the same or similar to processing a credit/debit card payment transaction.

While the communication connection is active, at step 205, the mobile communication device accesses product data, including product identification data, from the electronic POS system. As described above, the mobile communication device has a product registration app which retrieves the product data via the proximity communication connection. The product registration app may be integrated or a part of a mobile wallet app. The product registration app has software for configuring the mobile communication device to perform the steps of the method 200.

At step 206, the mobile communication device transmits the product data to the product registration system having a first computer. The mobile communication device transmits the product data to the product registration system via a communication network, which may include a cellular phone network, a WIFI connection, and/or the internet.

As an optional step, at step 208, the product registration app receives a message from the product registration system as to whether the product is eligible for registration using the automated registration process. The product registration system may perform the step 116 described above, and then it sends a message to the mobile communication device indicating whether the product is eligible. The message is processed by the product registration app, and if the product is eligible for registration, then the method 200 continues. If the product is not eligible, the method 200 is stopped.

At step 210, the mobile communication device receives a request to the consumer for authorization to register the product and/or to send consumer data to the product registration system. At step 212, the mobile communication device receives an entry from the consumer to accept or decline the request to register the product. The entry may be a selection on a keypad, touchscreen, or other data input device of the mobile communication device.

At step 214, the mobile communication device may also receive a message from the product registration system identifying the consumer data that is needed to complete the product registration. At step 216, the product registration app on the mobile communication device analyzes whether the consumer data needed to complete the product registration is included in a consumer data record on the mobile communication device. In setting up the product registration app, the consumer may input consumer data into the app which the app stores in a consumer data record. If the app determines that there is missing consumer data required to complete the registration, at step 218, the mobile communication device queries the consumer for the missing consumer data. At step 220, the mobile communication device receives the missing data by having the data input into the mobile communication device by the consumer using the data input device of the mobile communication device. Steps 214 through 220 are optional steps, and one or more of the steps may not be included in the method 200.

At step 222, the mobile communication device sends the consumer data to the product registration system. The consumer data may include the consumer data from a consumer data record stored on the mobile communication device and/or the consumer data entered into the mobile communication device by the consumer at step 220. As described above, the consumer data and product data are related to each such that the product registration system can determine that the product identified by the product data is to be registered to the consumer having the consumer data. At step 224, a product registration record is created using the product data and consumer data, as described in step 152 above.

Figure 3:
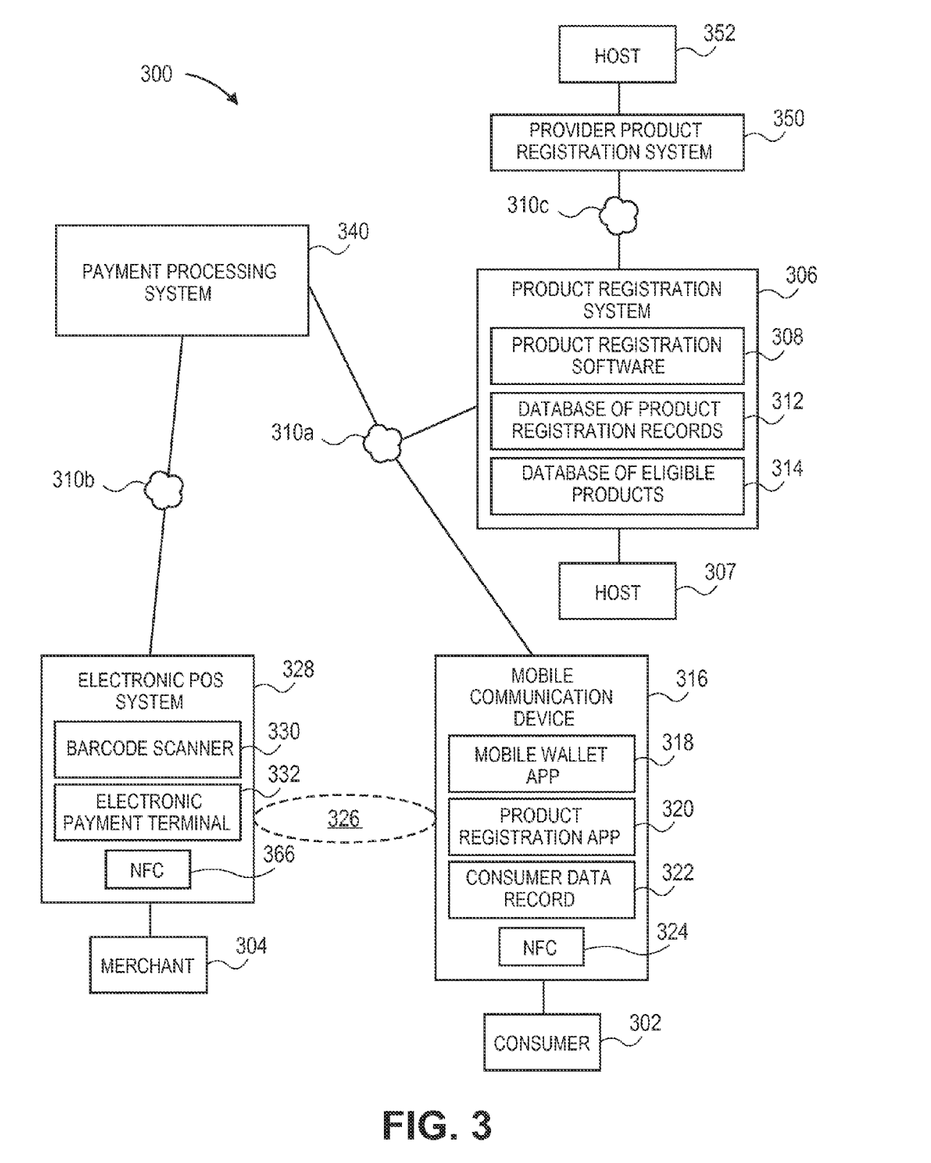
FIG. 3 illustrates an exemplary system for registering a product purchased by a consumer from a merchant in a purchase transaction, according to one embodiment of the present invention.

Referring now to FIG. 3, a non-limiting example of a system 300 is depicted that may be used to implement the methods for registering a product purchased by a consumer 302 from a merchant 304 in a purchase transaction, including methods 100 and 200 described above and any other method embodiments described herein. The system 300 comprises a product registration system 306, a merchant electronic point of sale (POS) system 328, a mobile communication device 316, and a payment processing system 340. The product registration system 306, mobile communication device 316 and payment processing system are in communication with each other through one or more communication networks 310*a*.

The product registration system 306 includes one or more computers hosting a product registration software program 308, and servers, storage devices and communication devices. The product registration system 306 is operated by a host 307. The software application 308 is configured to perform the steps of the method, such as receiving product data, sending inquiries for consumer data, receiving consumer data, determining whether a product is eligible for automated registration, and creating a product registration record. The product registration system 306 also has a database of product registration system records 312 and a database of products eligible for automated registration 314. The software program 308 receives and processes product data and consumer data through the communication network 310*a* coupled to the product registration system 306.

The mobile communication device 316, may be any suitable smartphone, cellular phone, tablet computer, or portable computer. The mobile communication device 316 has a mobile wallet app 318, a product registration app 320 and a consumer data record 322. The mobile communication device also has a communication device 324, such as an NFC device, for establishing a proximity communication connection 326 with the merchant electronic POS system 328. The mobile communication device 316 and apps are configured to perform the method 200 described above, and any other method embodiments described herein for the mobile communication device 316.

The electronic POS system 328 has software and hardware for processing sales transactions. The electronic POS system 328 may have a product scanner 330 for scanning products into the system 328, an electronic payment terminal 332 for processing electronic payments, and a proximity communication device 334, such as an NFC device, for establishing the proximity communication connection 326 with the mobile communication device 316.

The electronic POS system 328 is in communication with a payment processing system 340 through a communication network 310*b*. The payment processing system 340 may include any one or more of a merchant account processing system of the merchant account provider for the merchant, an electronic payment network system, such as those systems operated by Visa®, Mastercard®, or American Express®, and/or a financial account provider processing system, such as a those utilized by credit card or debit card issuers.

The product registration system 306 is also in communication with a provider product registration system operated by a product provider host 352 through a communication network 310*c*. The provider product registration system 350 is similar to the product registration system 306 and may have the same or similar hardware, software and functionality.

Each of the communication networks 310*a*-*c* may include a proprietary network, LAN, WAN, cellular network, wireless network, the internet and/or other suitable network, or a any combination of the foregoing.

Accordingly, a system 300 is provided which can provide and implement the methods for registering a product purchased by a consumer from a merchant in a purchase transaction, according to the methods 100 and 200, and any other methods described herein.

The methods 100 and 200, as well as any other method embodiments described herein, may also be embodied in, or readable from, a computer-readable medium (computer program carrier), e.g., one or more of the fixed and/or removable data storage data devices and/or data communications devices connected to a computer. The computer program carrier is readable by a computer and embodies instructions executable by a computer system and/or mobile communication device to perform the method steps of programming the system or device to perform the methods 100 and/or 200, or any other method embodiments described herein. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, and DVD-RW.

Although particular embodiments have been shown and described, it is to be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. Accordingly, embodiments are intended to exemplify alternatives, modifications, and equivalents that may fall within the scope of the claims.

What is claimed is:

1. A computer-implemented method for registering a product purchased by a consumer from a merchant in a purchase transaction, the method being performed by a product registration system including a computer and comprising the steps of:

the product registration system electronically receiving product data including product identification data, the product data being received from one of a merchant electronic point of sale system and a mobile communication device of the consumer, the product data having been obtained by the one of the merchant electronic point of sale system and the mobile communication device substantially concurrently with the purchase transaction;

the product registration system determining that the product is eligible for registration using a database of registrable products;

the product registration system identifying information needed to register the product;

the product registration system electronically sending a first message to the mobile communication device requesting authorization to access consumer data;

the product registration system electronically receiving consumer data including personal information of the consumer after receiving an authorization from the consumer to access consumer data, the consumer data and product data related to each other as part of the purchase transaction;

the product registration system electronically sending a second message to the mobile communication device requesting authorization to register the product to the consumer;

the product registration system receiving an authorization from the consumer to register the product to the consumer; and the product registration system creating a registration record relating the consumer to the product using the product data and the consumer data received by the product registration system.

2. The method of claim 1, wherein the consumer data is received from the mobile communication device of the consumer.

3. The method of claim 1, wherein the product data received by the product registration system is received from the mobile communication device after being transferred from the merchant electronic point of sale system to the mobile communication device and then being transferred from the mobile communication device to the product registration system.

4. The method of claim 1, further comprising electronically transmitting the registration record to a provider of the product.

5. The method of claim 4, wherein the provider is one of a manufacturer, a distributor, a reseller and a retailer of the product.

6. The method of claim 1, wherein the product data is received by the product registration system via a communication network.

7. The method of claim 1, wherein the product is a software computer program, and the product data includes a serial number.

8. A system for facilitating registration of a product purchased by a consumer from a merchant in a purchase transaction, comprising:

a product registration system comprising at least one computer and a database of registrable products, the product registration system operably coupled to a communication network for providing communication between the product registration system and at least one of a merchant electronic point of sale system and a mobile communication device of the consumer, the product registration system configured to:

electronically receive product data including product identification data from one of the merchant electronic point of sale system and the mobile communication device, the product registration system being configured to obtain the product data substantially concurrently with the purchase transaction;

determine that the product is eligible for registration using the database;

identify information needed to register the product;

electronically send a first message to the mobile communication device requesting authorization to access consumer data;

electronically receive consumer data including personal information of the consumer after receiving an authorization from the consumer to access consumer data, the consumer data and product data related to each other as part of the purchase transaction;

electronically send a second message to the mobile communication device requesting authorization to register the product to the consumer;

electronically receive an authorization from the consumer to register the product to the consumer; and create a registration record relating the consumer to the product using the product data and the consumer data received by the product registration system.

9. The system of claim 8 wherein the product registration system is configured to create the registration record by transmitting the product data and consumer data to a product provider registration system.

10. An article of manufacture comprising a non-transitory computer program carrier readable by a computer and embodying instructions executable by the computer to perform the method steps of registering a product purchased by a consumer from a merchant in a purchase transaction, comprising:

electronically receiving product data including product identification data, the product data received from one of a merchant electronic point of sale system and a mobile communication device of the consumer, the product data having been obtained by the merchant electronic point of sale system or the mobile communication device substantially concurrently with the purchase transaction;

determining that the product is eligible for registration using a database of registrable products;

identifying information needed to register the product;

electronically sending a first message to the mobile communication device requesting authorization to access consumer data;

electronically receiving consumer data including personal information of the consumer, the consumer data and product data related to each other as part of the purchase transaction;

electronically sending a second message to the mobile communication device requesting authorization to register the product to the consumer;

electronically receiving an authorization from the consumer to register the product to the consumer; and creating a registration record relating the consumer to the product using the product data and the consumer data received by the product registration system.

11. The system of claim 8, the product registration system being configured to receive the consumer data from the mobile communication device of the consumer.

12. The system of claim 8, the product registration system being configured to receive the product data from the mobile communication device after being transferred from the merchant electronic point of sale system to the mobile communication device and then being transferred from the mobile communication device to the product registration system.

13. The system of claim 8, the product registration system being configured to transmit the registration record to a provider of the product.

14. The system of claim 8, wherein the provider is one of a manufacturer, a distributor, a reseller and a retailer of the product.

15. The system of claim 8, the product registration system being configured to receive the product data via a communication network.

16. The system of claim 8, wherein the product is a software computer program, and the product data includes a serial number.

17. The article of manufacture of claim 10, wherein the consumer data is received from the mobile communication device of the consumer.

18. The article of manufacture of claim 10, wherein the product data received by the product registration system is received from the mobile communication device after being transferred from the merchant electronic point of sale system to the mobile communication device and then being transferred from the mobile communication device to the product registration system.

19. The article of manufacture of claim 10, the method steps further comprising electronically transmitting the registration record to a provider of the product.

20. The article of manufacture of claim 19, wherein the provider is one of a manufacturer, a distributor, a reseller and a retailer of the product.

21. The article of manufacture of claim 10, wherein the product data is received by the product registration system via a communication network.

22. The article of manufacture of claim 10, wherein the product is a software computer program, and the product data includes a serial number.

* * * * *